April 25, 1961 L. C. TRUMBO 2,981,269
MATERIAL HANDLING AND COOLING CONVEYOR
Filed Dec. 22, 1958 2 Sheets-Sheet 1

Leroy C. Trumbo
INVENTOR.

April 25, 1961     L. C. TRUMBO     2,981,269
MATERIAL HANDLING AND COOLING CONVEYOR
Filed Dec. 22, 1958     2 Sheets-Sheet 2

Leroy C. Trumbo
INVENTOR.

BY *Clarence A. O'Brien*
*and Harvey B. Jacobson*
Attorneys

United States Patent Office 2,981,269
Patented Apr. 25, 1961

2,981,269

MATERIAL HANDLING AND COOLING CONVEYOR

Leroy C. Trumbo, 1106 Kansas Ave., Memphis, Tenn.

Filed Dec. 22, 1958, Ser. No. 782,246

5 Claims. (Cl. 134—153)

This invention comprises a novel and useful material handling and cooling conveyor, and more specifically relates to a conveying apparatus for effectively transporting hot materials and for facilitating cooling of such materials during their transportation.

Frequently, certain industrial processes necessitate the conveying and transporting of highly heated bulk materials from one location to another, as, for example, the transporting of cement or other clinker from a kiln to a place of storage or an apparatus for subsequently treating the same. Heretofore, it has been necessary to provide a pit or collection area where the hot material may be deposited until the same is sufficiently cooled to permit subsequent treatment or processing of the material in the intended process through which the material is being passed.

It is the primary purpose of the present invention to provide a conveyor which will facilitate the handling of hot bulk material and the transportation of the same between two stations and to simultaneously provide means for cooling the material during such transit, and thereby avoiding the necessity for delay or for the provision of a separate place of storage of the material to effect cooling of the same before it can be further treated at its intended destination.

A further object of the invention is to provide a conveyor in accordance with the foregoing object which shall be effective for securing a drop in the temperature of the material being conveyed, as, for example, from a temperature of 1800° down to about 300°, wherein such temperature drop may be effected in about three minutes, and wherein the travel of the material is performed at about 35 feet per minute.

A further object of the invention is to provide a conveyor in accordance with the foregoing objects which shall have a lifting and tossing motion whereby the material may be intermittently caused to travel through the air during its travel, thereby greatly facilitating travel of the material and also cooling of the same during its transit.

Yet another object of the invention is to provide an apparatus in accordance with the preceding objects wherein noxious and other fumes rising from the heated material may be sanitarily removed therefrom and prevented from escaping into the region adjacent to the conveyor.

Yet another and more specific object of the invention is to provide a material handling cooling conveyor in accordance with the above-mentioned objects which shall be of an extremely sturdy construction, shall be compact and highly efficient in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figures 1, 2:
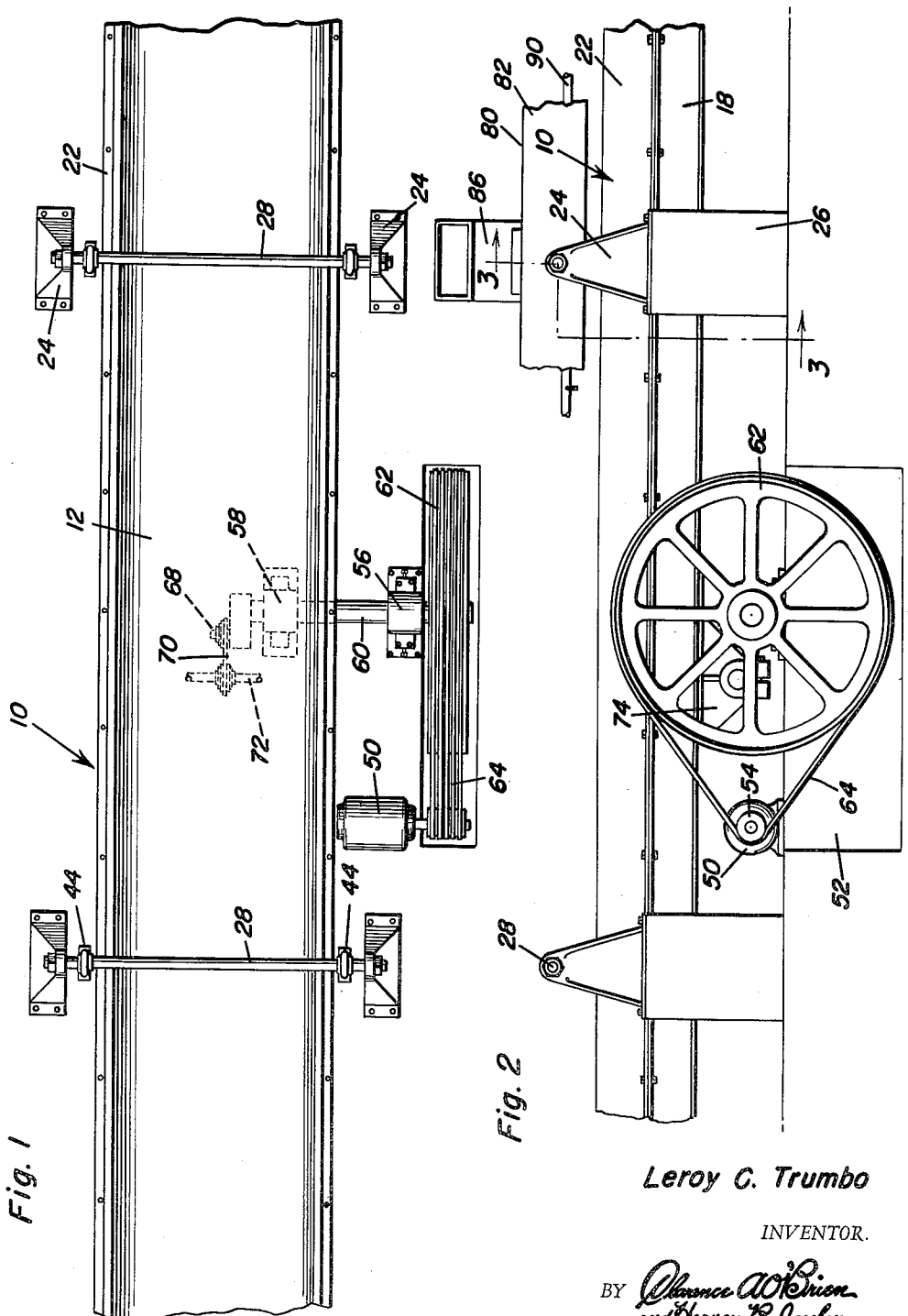
Figure 1 is a top plan view of a portion of a cooling conveyor in accordance with this invention, parts being broken away and certain concealed parts being shown in dotted lines therein; and with the covering hood of the conveyor being removed therefrom.
Figure 2 is a side elevational view of the arrangement of Figure 1 but with the hood in place thereon.

Referring now more specifically to the accompanying drawings, it will be seen that the numeral 10 designates generally a suitable embodiment of apparatus in accordance with the principles of this invention.. As will be more clearly seen by reference to Figures 1–3, there is provided a conveyor bed 12 consisting of an elongated, trough or chute having a substantially flat bottom wall 14, together with upstanding side walls 16. This conveyor bed is supported upon a suitable supporting framework which consists of a pair of longitudinally extending channel members or beams, as at 18, having cross-members 20 secured to and resting upon the upper flanges thereof and which, in turn, support the bottom wall 14 of the bed 12 which is, in turn, secured thereto. Upstanding beams or panels 22 in turn are secured to the upper flanges of the longitudinal side beams 18 and to the upper edges of the side walls 16 to thereby reinforce, brace and secure the side walls of the bed to the supporting framework.

It will be understood that the bed 12 may be of any desired length. In a suitable embodiment of apparatus in accordance with this invention, this bed is preferably in the order of 100 feet in length, it being understood that the length of the bed will be determined in accordance with the nature of the material to be transported and cooled during such transportation, as well as the rate of travel of the material along the bed and the time required to effect the cooling operation.

The bed and its supporting framework are mounted and supported for oscillatory motion, which motion is employed to effect the travel of the material along the bed longutudinally thereof by a sequence of steps.

The means for mounting and supporting the bed 12 comprises a plurality of pairs of longitudinally spaced standards 24, each mounted upon a base 26 which may be of cement or other suitable material, the standards in each pair being disposed on opposite sides of the bed. Obviously, any desired number of pairs of standards will be employed, depending upon the length of the bed and the load which the same is adapted to transport and support.

Secured to the upper ends of each pair of standards and extending transversely above the bed between the standards is an axle 28 which may be removably secured to the standards, as by means of fastening bolts 30 cooperating with the screw-threaded extremities 32 of each axle. Associated with each axle 28 and disposed transversely beneath the supporting framework of the bed, as by means of the mounting brackets 34, is a shaft 36, it being understood that there is provided one such shaft for each of the axles 28.

Each vertically disposed pair of the axles and shafts 28 and 36 have their extremities connected to each other as by adjustable support or connecting arms 38. For this purpose, the lower ends of the connecting rods 38 are provided with bifurcated extremities 40 which are clamped and secured as by clamping bolts 42 to the ends of the shafts 36. The upper ends of the connecting rods are provided with apertured bearings 44 which are rotatably received upon the axles 28 and which are screw-threadedly engaged upon the upper ends of the connecting rods, locking nuts 46 being provided to secure the same in adjusted position. By this means, the length of the supporting or connecting arms 38, and therefore the height of the bed, may be adjusted or regulated as desired.

As so far described, now it will be apparent that the elongated bed has been mounted upon the plurality of support means for a vertically oscillating or swinging movement about the transverse axles 28 in a longitudinal direction with respect to the longitudinal axis of the bed.

Power means are provided for imparting oscillatory movement to the bed and thereby causing a longitudinal progression of material along the bed in a step-by-step manner. This power means comprises, as shown best in Figures 1 and 2, a source of power such as an electric motor 50 mounted upon a suitable support base 52 and provided with driving pulleys 54. Likewise suitably journalled in supporting bearings 56 and 58 is a drive shaft 60 having a series of pulley wheels 62 which are connected to the previously mentioned motor pulley wheels 54 as by a series of belts 64.

As will be best noted from Figure 1, the end of the drive shaft 60 is positioned below the mid portion of the bed 12. This extremity of the drive shaft has thereon a crank arm 66 provided with a crank pin 68 to which is journalled one end of a connecting link 70. The other end of this connecting link is journalled, as at 72, in a bracket 74 which is secured to a side beam 18 forming a part of the supporting framework upon which the bed 12 is mounted.

The arrangement is such that upon rotation of the shaft 60 by the motor 50, reciprocation is imparted to the link 70, thereby producing an oscillatory movement of the bed about its supporting axles 28. This motion is indicated best in Figure 4, as will be noted by a comparison of the full line and dotted line position of one of the connecting rods 38.

The arrangement is such that the connecting linkage between the shaft 60 and the oscillating bed causes an accelerating movement of the latter as the same approaches one limit of its range of oscillation, with a rapid reversal of the bed upon its return stroke. This relative increase in the rate of movement of the bed at one extremity of its swinging movement has the effect of lifting and tossing the material thereon longitudinally of the bed which is then rapidly pulled backwardly beneath the material, thus causing a step-by-step progression of the material along the bed.

As the material is tossed from the surface of the bed upwardly and through the air during this reversal of oscillation of the bed itself, it will be exposed to the cooling effects of the air as well as caused to progress longitudinally along the bed. In some instances, this may be sufficient to effect the desired cooling action upon the material as the latter progresses the length of the bed. In other instances, it is to be understood that other cooling means may be provided to supplement this action such as the provision of a water spray, or the like. Further, it is contemplated that a hood may be placed over the bed along the length of the same and means provided for drawing off from the bed in the space beneath this hood, and thereafter disposing of the same, fumes arising from the material which is transported and cooled by its passage along the bed. In some instances, the hood and cooling spray may be omitted and the conveyor employed as described.

For handling many materials, however, the use of the cooling spray to more rapidly lower the temperature of the heated material and the services of the hood for removing noxious fumes is preferred.

Figure 4:
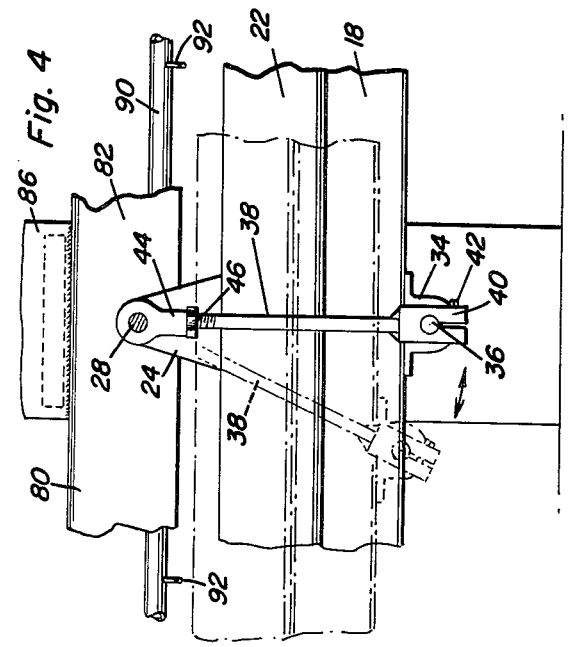
Figure 4 is a vertical longitudinal sectional detail view taken substantially upon the plane indicated by the section line 4—4 of Figure 3, and alternative positions of the parts being shown in dotted lines therein.
Figure 6:
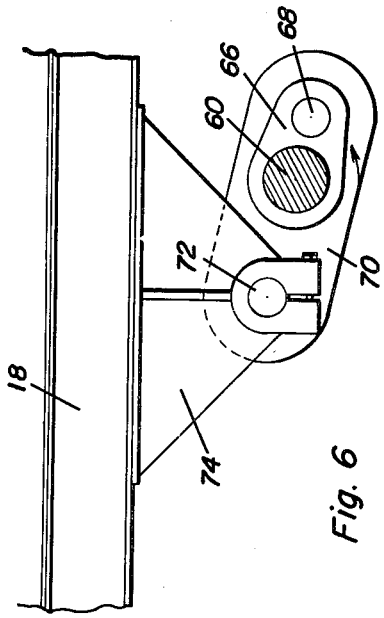
Figures 5 and 6 are detail views in vertical section showing a portion of the actuating mechanism of the conveyor.
Figure 3:
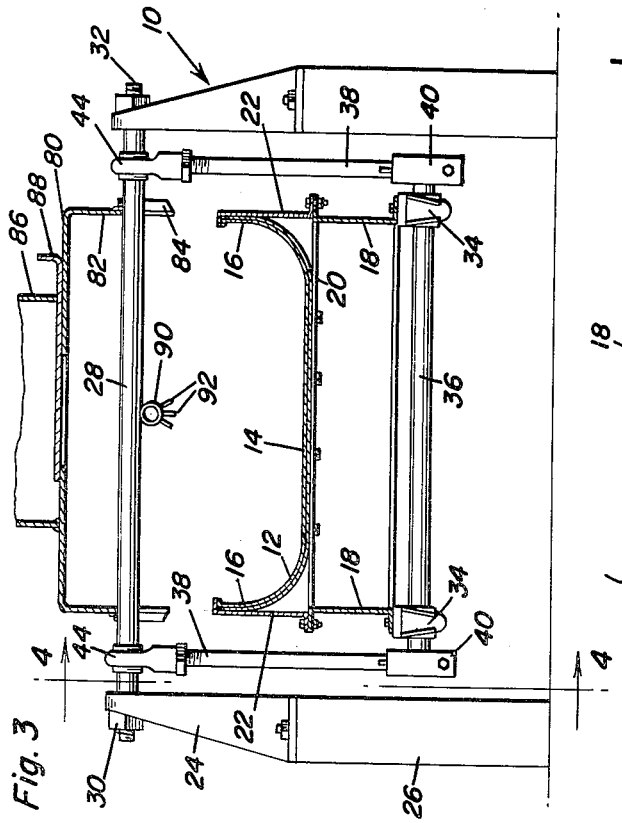
Figure 3 is a vertical transverse sectional detail view taken upon an enlarged scale substantially upon the plane indicated by the section line 3—3 of Figure 2.
Figure 5:
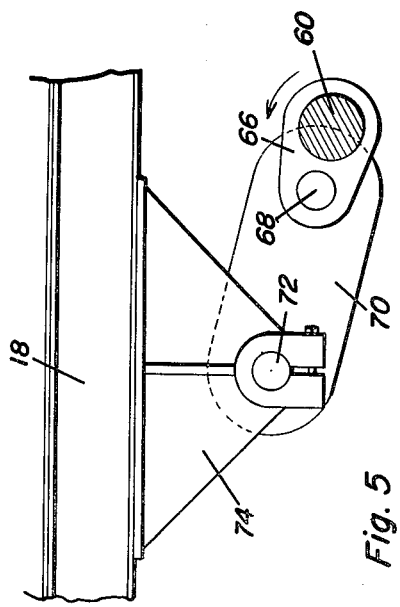

As shown in Figures 2–4, an inverted U-shaped hood or cover 80 is disposed above the trough 12 and extends all or any desired portion or portions of the lengths thereof and is spaced thereabove a sufficient distance to permit the necessary rise and fall of the trough sides and members 16 and 22 during the movement of the trough. The hood is supported by the transverse sides 28 which extend through the hood side walls 82, being received in upwardly opening slots 84 in downwardly projecting portions of the side walls whereby the hood may be readily removed by merely lifting it, as desired. At one or more suitable locations along the top of the hood are exhaust ducts 86, connected to suitable exhaust fans, not shown, and controlled by sliding valves or dampers 88, Figures 3, for removing fumes trapped from the material being handled by the conveyor.

Disposed below the hood 80 is a spray cooling system by which water or other cooling fluid from any suitable source and under any suitable control means, not shown, is sprayed down upon the trough by longitudinal pipes 90 with spray nozzles 92. The pipes 90 are supported preferably from the hood 80 or the axles 28 in a manner not shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A material handling cooling conveyor comprising an elongated bed for supporting and transporting material longitudinally thereof, means supporting said bed for swinging movement in a longitudinal direction about horizontal axes disposed transversely of said bed, actuating means connected to said bed for imparting oscillatory movement to said bed about said axes, said supporting means including axles mounted above and extending transversely of said bed, a hood disposed above said bed and in closely spaced relation to the sides thereof for collecting fumes rising from the material being transported by the conveyor, said hood comprising an inverted U-shaped housing, including a pair of side walls, notches defined in the lower edges of said side walls removably receiving and resting upon said axles.

2. The combination of claim 1 wherein said actuating means includes a drive shaft disposed transversely beneath said bed, means for continuously rotating said drive shaft, means connecting said drive shaft to said bed for imparting longitudinal oscillations to the latter.

3. The combination of claim 1 wherein said actuating means includes a drive shaft disposed transversely beneath said bed, means for continuously rotating said drive shaft, means connecting said drive shaft to said bed for imparting longitudinal oscillations to the latter and for imparting accelerated movement to said bed at one extreme of its path of oscillation.

4. The combination of claim 1 wherein said hood includes means for spraying cooling fluid upon said bed for cooling heated material conveyed longitudinally thereof.

5. The combination of claim 1 wherein said hood includes means for educting fumes from said hood.

References Cited in the file of this patent

UNITED STATES PATENTS

| | | |
|---|---|---|
| 672,137 | Stiefel | Apr. 16, 1901 |
| 1,645,695 | Forrest | Oct. 18, 1927 |
| 1,708,057 | Gehring | Apr. 9, 1929 |
| 1,847,309 | Schmidt | Mar. 1, 1932 |
| 2,163,556 | Glaze | June 20, 1939 |
| 2,175,259 | Erickson | Oct. 10, 1939 |
| 2,601,411 | McLauchlan | June 24, 1952 |
| 2,674,550 | Dunlevy | Apr. 6, 1954 |